US011189875B1

(12) United States Patent
Alobaidi

(10) Patent No.: US 11,189,875 B1
(45) Date of Patent: Nov. 30, 2021

(54) BATTERY SYSTEMS CONTAINING RECYCLABLE BATTERY PORTIONS

(71) Applicant: Green Cubes Technology Corporation, Kokomo, IN (US)

(72) Inventor: Mohammed Alobaidi, Kokomo, IN (US)

(73) Assignee: Green Cubes Technology, LLC, Kokomo, IN (US)

(*) Notice: Subject to any disclaimer, the term of this patent is extended or adjusted under 35 U.S.C. 154(b) by 300 days.

(21) Appl. No.: 15/837,391

(22) Filed: Dec. 11, 2017

Related U.S. Application Data

(60) Provisional application No. 62/431,895, filed on Dec. 9, 2016.

(51) Int. Cl.
| | | |
|---|---|---|
| *B62B 3/04* | (2006.01) | |
| *H01M 50/20* | (2021.01) | |
| *H01M 10/54* | (2006.01) | |
| *H01M 50/502* | (2021.01) | |

(52) U.S. Cl.
CPC ............ *H01M 50/20* (2021.01); *B62B 3/04* (2013.01); *H01M 10/54* (2013.01); *H01M 50/502* (2021.01); *B62B 2202/56* (2013.01); *B62B 2202/61* (2013.01); *H01M 2220/30* (2013.01)

(58) Field of Classification Search
CPC ........... B62B 3/02; B62B 3/04; B62B 5/0053; B62B 2202/56; B62B 2202/61; H01M 2/0202; H01M 2/0242; H01M 2/1022; H01M 10/54; H01M 10/42; H01M 2220/30; G06F 1/188; A61G 12/001; A61G 2203/20
See application file for complete search history.

(56) References Cited

U.S. PATENT DOCUMENTS

| | | | | | |
|---|---|---|---|---|---|
| 1,980,902 | A | * | 11/1934 | Blake | H01M 2/0242 429/179 |
| 6,160,702 | A | * | 12/2000 | Lee | G06F 1/1635 361/679.32 |
| 6,599,658 | B2 | * | 7/2003 | Vackar | H01M 2/0237 429/100 |
| 8,169,191 | B2 | * | 5/2012 | Werthman | A61B 5/0002 320/107 |
| 8,338,985 | B2 | * | 12/2012 | Murtha | G06F 1/263 307/65 |

(Continued)

FOREIGN PATENT DOCUMENTS

EP 2290728 A1 * 3/2011 ........ H01M 10/6555

*Primary Examiner* — Steve Clemmons
(74) *Attorney, Agent, or Firm* — Reichel Stohry Dean LLP; Mark C. Reichel; Natalie J. Dean

(57) ABSTRACT

Battery systems containing recyclable battery portions. The present disclosure includes disclosure of a battery system, comprising a housing configured to retain two or more battery portions; two or more battery portions configured to fit within the housing; wherein the housing is configured to fit within a battery compartment of a cart; wherein the two or more battery portions, when effectively connected together using a central connector of the battery system, collectively produce sufficient power to power electronic equipment of the cart; and wherein each of the two or more battery portions weigh at or below a desired threshold weight.

16 Claims, 6 Drawing Sheets

(56) References Cited

U.S. PATENT DOCUMENTS

| | | | | |
|---|---|---|---|---|
| 8,567,798 B2* | 10/2013 | Rossini | ............... | A61G 12/001 |
| | | | | 280/43 |
| 9,367,061 B2* | 6/2016 | Miller | ................. | G05B 19/042 |
| 9,564,620 B2* | 2/2017 | Kawaguchi | ......... | H01M 2/1077 |
| 9,583,803 B2* | 2/2017 | Miller | .................... | H02J 7/025 |
| 9,705,359 B2* | 7/2017 | Boyd | ................... | H02J 7/0045 |
| 9,837,834 B2* | 12/2017 | Sugiyama | ............. | H02J 7/0021 |
| 9,948,134 B2* | 4/2018 | Wojcik | ................ | H01M 2/1094 |
| 9,991,501 B2* | 6/2018 | DeKeuster | .......... | H01M 2/1294 |
| 10,008,710 B2* | 6/2018 | Zhang | ................. | H01M 2/345 |
| 10,014,560 B2* | 7/2018 | Ju | ........................ | H01M 2/345 |
| 10,096,813 B2* | 10/2018 | Duffield | ............. | H01M 2/0242 |
| 2009/0261656 A1* | 10/2009 | Coonan | .................... | G06F 1/16 |
| | | | | 307/80 |
| 2010/0183910 A1* | 7/2010 | Nishino | ............. | H01M 2/1055 |
| | | | | 429/163 |
| 2012/0203377 A1* | 8/2012 | Paydar | .................... | G01K 3/04 |
| | | | | 700/232 |
| 2012/0248719 A1* | 10/2012 | Rossini | ............... | A61G 12/001 |
| | | | | 280/29 |
| 2013/0071708 A1* | 3/2013 | Delans | ............... | H01M 2/0242 |
| | | | | 429/82 |
| 2014/0098525 A1* | 4/2014 | Bennett | .................... | H02J 7/00 |
| | | | | 362/183 |
| 2017/0110766 A1* | 4/2017 | Koebler | .................. | H01M 2/34 |
| 2019/0299332 A1* | 10/2019 | Ogawa | ............... | H01M 2/0217 |

* cited by examiner

BATTERY SYSTEMS CONTAINING RECYCLABLE BATTERY PORTIONS

PRIORITY

The present application is related to, and claims the priority benefit of, U.S. Provisional Patent Application Ser. No. 62/431,895, filed Dec. 9, 2016, the contents of which are hereby incorporated into the present disclosure directly and in their entirety.

BACKGROUND

When a standard lithium battery used with a medical cart, for example, reaches the end of its life, it cannot be readily recycled because it weighs over the eleven pound limit for lithium battery recycling by various recycling entities. As such, when current lithium batteries on the market expire, hospitals and other users of said lithium batteries cannot recycle them, and are effectively stuck with a stockpile of dead batteries without reasonable options for recycling and/or disposal. Shipping these heavy dead batteries is also problematic as most shipping companies will not permit shipment of hazardous materials, and special certifications may be required in order to ship lithium batteries.

In view of the same, battery systems useful to power medical carts or other electronic equipment that contain elements that can be readily recycled would be well received in the marketplace.

BRIEF SUMMARY

The present disclosure includes disclosure of a battery system, comprising a housing configured to retain two or more battery portions; two or more battery portions configured to fit within the housing; wherein the housing is configured to fit within a battery compartment of a cart; wherein the two or more battery portions, when effectively connected together using a central connector of the battery system, collectively produce sufficient power to power electronic equipment of the cart; and wherein each of the two or more battery portions weigh at or below a desired threshold weight, such as eleven pounds, a weight greater than eleven pounds, or a weight less than eleven pounds.

The present disclosure includes disclosure of a battery system, wherein the housing comprises a front door or cover coupled thereto.

The present disclosure includes disclosure of a battery system, wherein each battery portion of the two or more battery portions can be charged by a power source when positioned within the housing within the battery compartment of the cart.

The present disclosure includes disclosure of a battery system, wherein each battery portion of the two or more battery portions can be charged by a power source when positioned within the housing outside of the battery compartment of the cart.

The present disclosure includes disclosure of a battery system, wherein each battery portion of the two or more battery portions can be charged by a power source when positioned outside of the housing.

The present disclosure includes disclosure of a battery system, comprising a housing configured to retain two or more battery portions; two or more battery portions configured to fit within the housing; wherein the housing is configured to fit within a battery compartment of a cart; wherein the two or more battery portions, when effectively connected together using a central connector of the battery system, collectively produce sufficient power to power electronic equipment of the cart; and wherein each of the two or more battery portions weigh at or below a desired threshold weight.

The present disclosure includes disclosure of a battery system, wherein the threshold weight is eleven pounds.

The present disclosure includes disclosure of a battery system, wherein the threshold weight is less than eleven pounds.

The present disclosure includes disclosure of a battery system, wherein each battery portion of the two or more battery portions are configured to be charged by a power source when positioned within the housing within the battery compartment of the cart.

The present disclosure includes disclosure of a battery system, wherein each battery portion of the two or more battery portions are configured to be charged by an external power source when the two or more battery portions are positioned within the housing within the battery compartment of the cart.

The present disclosure includes disclosure of a battery system, wherein each battery portion of the two or more battery portions are configured to be charged by a power source when the two or more battery portions are positioned outside of the housing.

The present disclosure includes disclosure of a battery system, wherein the housing comprises a front door or cover coupled thereto, wherein the front door or cover can allow access to the two or more battery portions when the front door or cover is open.

The present disclosure includes disclosure of a battery system, wherein the housing comprises a top door or cover coupled thereto, wherein the top door or cover can allow access to a first manifold and a second manifold of the battery system when the top door or cover is open.

The present disclosure includes disclosure of a battery system, further comprising a positive terminal and a negative terminal present on a relative exterior of the external housing.

The present disclosure includes disclosure of a battery system, wherein the central connector is further connected to the positive terminal and the negative terminal so that the electronic equipment of the cart, when connected to the positive terminal and the negative terminal, can be powered from the two or more battery portions.

The present disclosure includes disclosure of a battery system, wherein the two or more battery portions are stacked vertically.

The present disclosure includes disclosure of a battery system, configured so that when a first battery portion of the two or more battery portions are removed for recycling, the first battery portion can be recycled as it is below the desired threshold weight, and further configured to receive a replacement battery portion to replace the first battery portion of the two or more battery portions.

The present disclosure includes disclosure of a battery system, forming part of a cart system, the cart system further comprising a computer and a display.

The present disclosure includes disclosure of a battery system, comprising a housing configured to retain two or more battery portions; two or more battery portions configured to fit within the housing; wherein the housing is configured to fit within a battery compartment of a cart; wherein the housing comprises a front door or cover coupled thereto, wherein the front door or cover can allow access to the two or more battery portions when the front door or cover is open; wherein the housing comprises a top door or cover coupled thereto, wherein the top door or cover can allow access to a first manifold and a second manifold of the battery system when the top door or cover is open; wherein the two or more battery portions, when effectively connected together using a central connector of the battery system, collectively produce sufficient power to power electronic equipment of the cart when the electronic equipment is connected to a positive terminal and a negative terminal of the battery system that is also connected to the central connector; and wherein each of the two or more battery portions weigh at or below eleven pounds.

The present disclosure includes disclosure of a battery system, configured so that when a first battery portion of the two or more battery portions are removed for recycling, the first battery portion can be recycled as it is below the desired threshold weight, and further configured to receive a replacement battery portion to replace the first battery portion of the two or more battery portions.

The present disclosure includes disclosure of a cart, comprising a battery system of the present disclosure, a computer, and a display, wherein the housing is configured to fit within a battery compartment of the cart, wherein the two or more battery portions collectively produce sufficient power to power the computer and the display, and wherein each of the two or more battery portions weigh at or below a desired threshold weight.

The present disclosure includes disclosure of a cart, wherein the threshold weight is eleven pounds.

The present disclosure includes disclosure of a cart, wherein the housing comprises a front door or cover coupled thereto, wherein the front door or cover can allow access to the two or more battery portions when the front door or cover is open, and wherein the housing further comprises a top door or cover coupled thereto, wherein the top door or cover can allow access to a first manifold and a second manifold of the battery system when the top door or cover is open.

The present disclosure includes disclosure of a cart, wherein each battery portion of the two or more battery portions are configured to be charged by an external power source when the two or more battery portions are positioned within the housing within the battery compartment of the cart.

The present disclosure includes disclosure of a cart, configured so that when a first battery portion of the two or more battery portions are removed for recycling, the first battery portion can be recycled as it is below the desired threshold weight, and further configured to receive a replacement battery portion to replace the first battery portion of the two or more battery portions.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
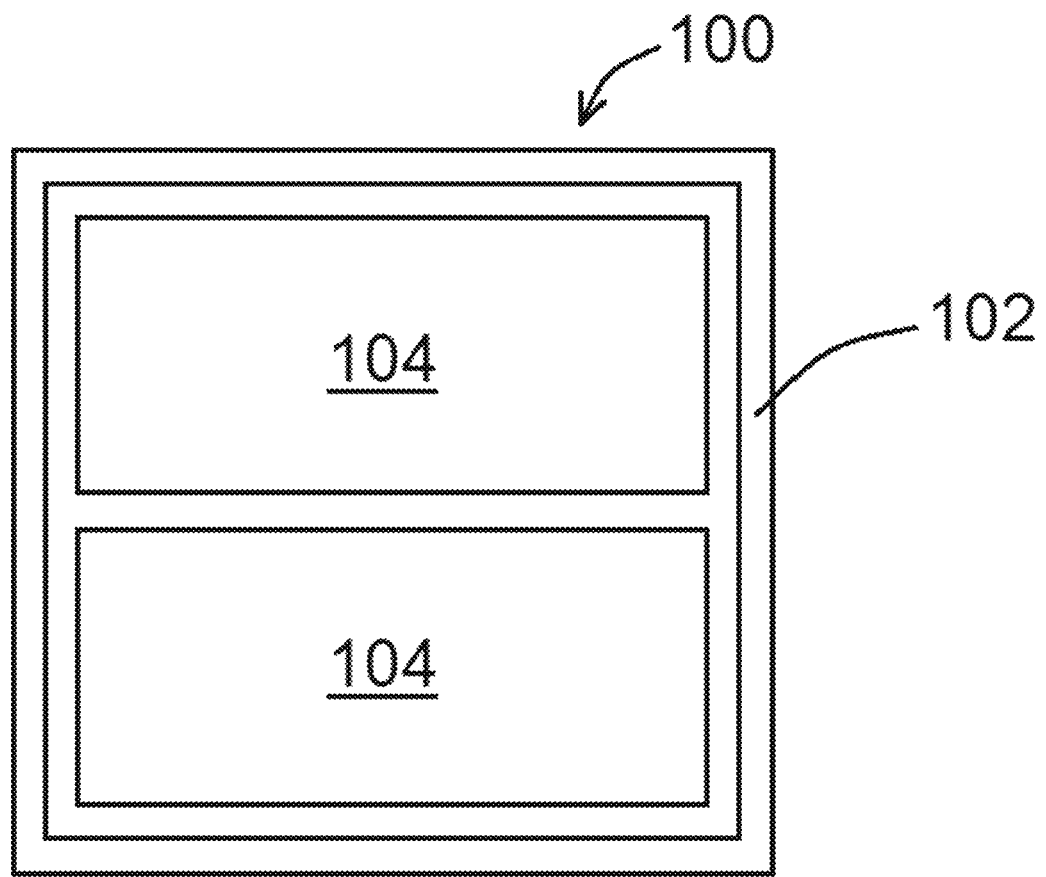
FIG. 1 shows a component diagram of various components of a battery system, according to at least one embodiment of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of battery systems and methods to use the same to power various electronic equipment, such as, for example, hospital carts. An exemplary embodiment of a battery system of the present disclosure is shown in FIG. 1. As shown in FIG. 1, battery system 100 comprises an external housing 102, and a plurality of battery portions 104. Battery systems 100 of the present disclosure include at least two battery portions 104, configured to fit within housing 102. Housings 102, in various embodiments, are configured to fit within battery compartments 202 of a carts 200, for example.

Exemplary battery portions 104 of the present disclosure are configured so to weigh below a desired weight. For example, and in various embodiments, battery portions 104 of the present disclosure can each weigh at or below eleven (11) pounds. In other embodiments, battery portions 104 of the present disclosure can each weigh at or below another desired threshold weight, such as a weight greater than eleven (11) pounds or less than eleven (11) pounds, such as twelve (12) pounds or more or ten (10) pounds or less. Said battery portions 104, such as when configured as lithium batteries, must be at or below eleven pounds so that they can be readily recycled, as certain jurisdictions permit recycling of lithium batteries that weigh at or below eleven pounds.

Figure 2:
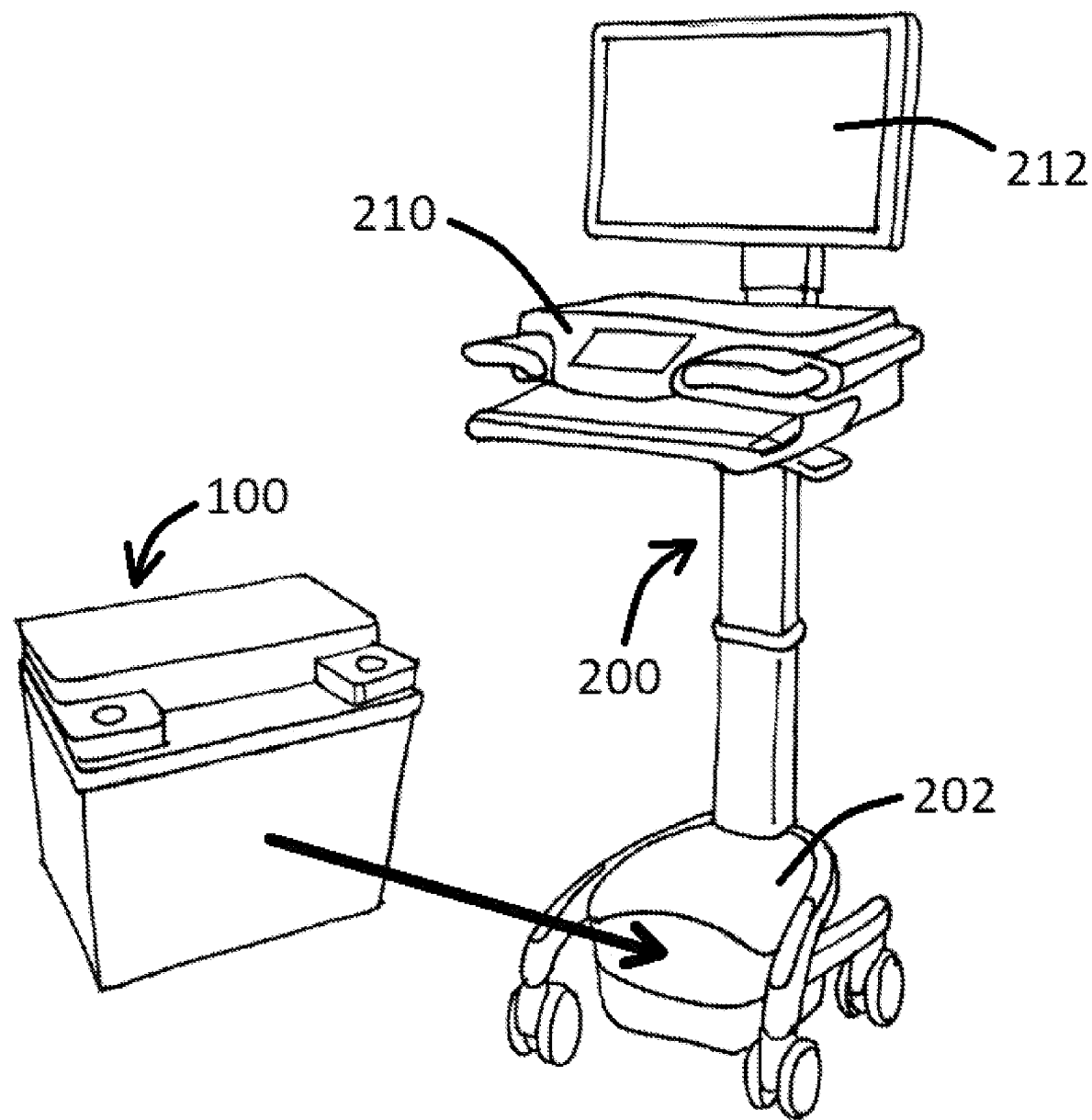
FIG. 2 shows a battery system for use with a cart, according to at least one embodiment of the present disclosure.

In at least some embodiments, battery portions 104 of the present disclosure are lithium batteries, and are configured for use to power components of a cart 200, such as a computer 210 and/or a display 212. Two or more battery portions 104 can be used, and would be configured to fit within external housing 102, and whereby external housing 102, with the two or more battery portions 104 positioned therein, is configured to fit within a battery compartment 202 of a cart 200 (battery compartment 202 is covered as shown in FIG. 2). In at least some embodiments, external housings 102 are configured to be sized as a group size U1 battery, which is a standard size used to power various carts 200 made by various manufacturers.

For example, and when a standard cart lithium battery reaches the end of its life, it cannot be readily recycled because they weigh over the eleven pound threshold. As such, when current lithium batteries on the market expire, hospitals and other users of said lithium batteries cannot recycle them, and are effectively stuck with a stockpile of dead batteries without reasonable options for recycling and/or disposal. Shipping these heavy dead batteries is also problematic as most shipping companies will not permit shipment of hazardous materials, and special certifications may be required in order to ship lithium batteries.

Battery systems 100 of the present disclosure are a solution to this problem, as the individual battery portions 104 each weigh within the allowable limit to permit recycling, which can be conveniently done at many home improvement stores. Should a user of a battery system 100 of the present disclosure need to replace one or more battery portions 104, those individual battery portions 104 can be readily replaced within external housing 102, and the expired battery portions 104 can be readily recycled. Battery portions 104 within external housing 102 can be effectively connected to one another, so that the power provided by the battery portions 104 within external housing 102 can be effectively combined and used to power cart 200 components.

Carts 200, as referenced herein, may include, for example, hospital carts that are used to transport and power computer equipment so that medical personnel can move the carts 200 to locations as desired, such as at or near patients or to areas where patient care is provided and/or where patent data is entered and/or retrieved from the computer equipment. As shown in FIG. 2, cart 200 can comprise a computer 210 (which can be, for example, electronic equipment having a processor and memory and a storage medium or access to a storage medium, also referred to as a console, terminal, personal computer, laptop computer, tablet, smartphone or other smart device, touchpad, and the like) and a display 212 coupled to, such as in the case of a terminal or personal computer, or formed as part of computer 210, such as in the case of a tablet. Said carts 200 are also used, for example, in connection with dispensing medication for patients, whereby the computer 210 is configured as electronic equipment used, for example, in connection with regulating intravenous administration of medicine to a patient.

Figure 3:
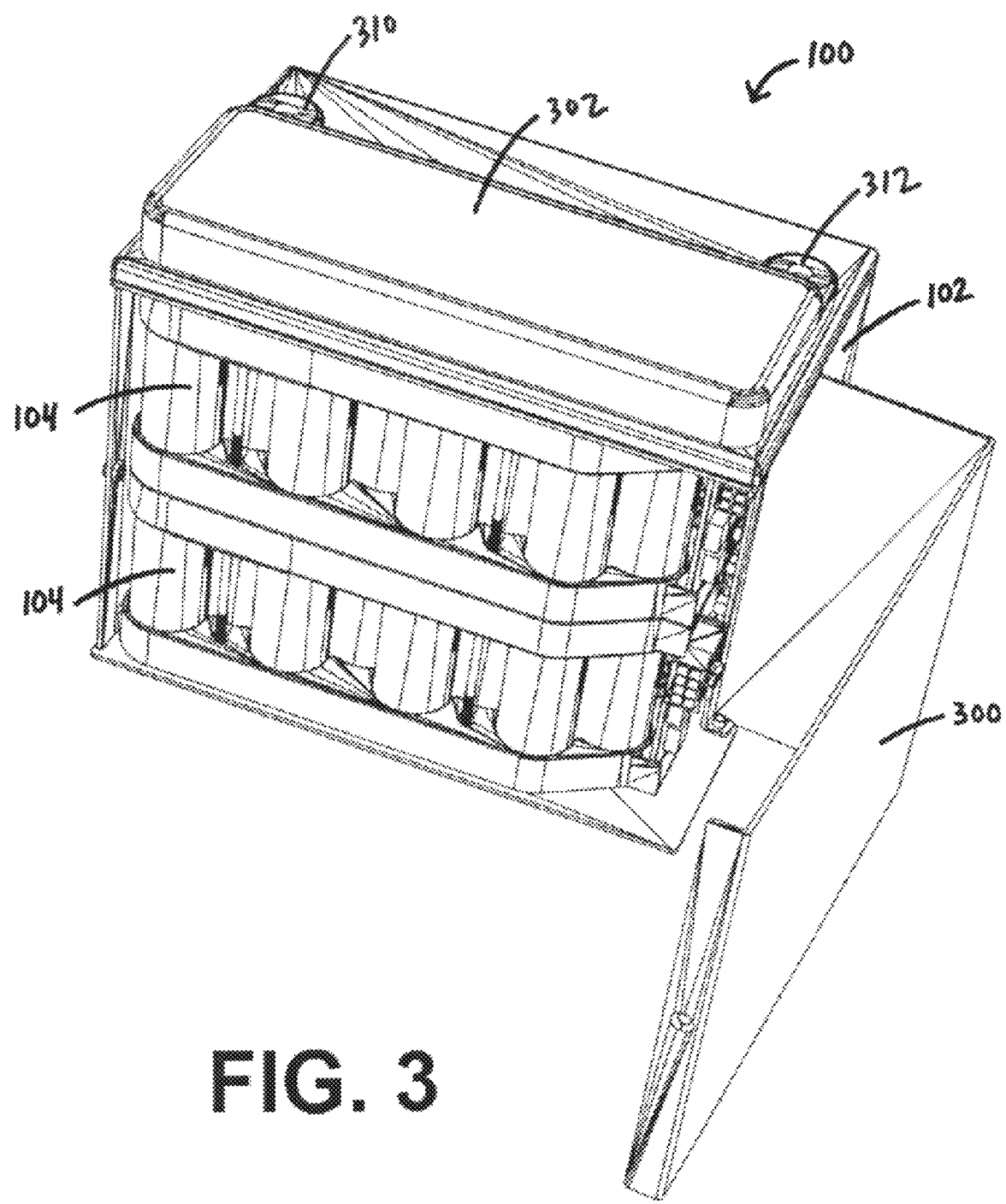
FIG. 3 shows a perspective view of an exemplary battery system with a plurality of battery portions therein, according to at least one embodiment of the present disclosure.
Figure 4:
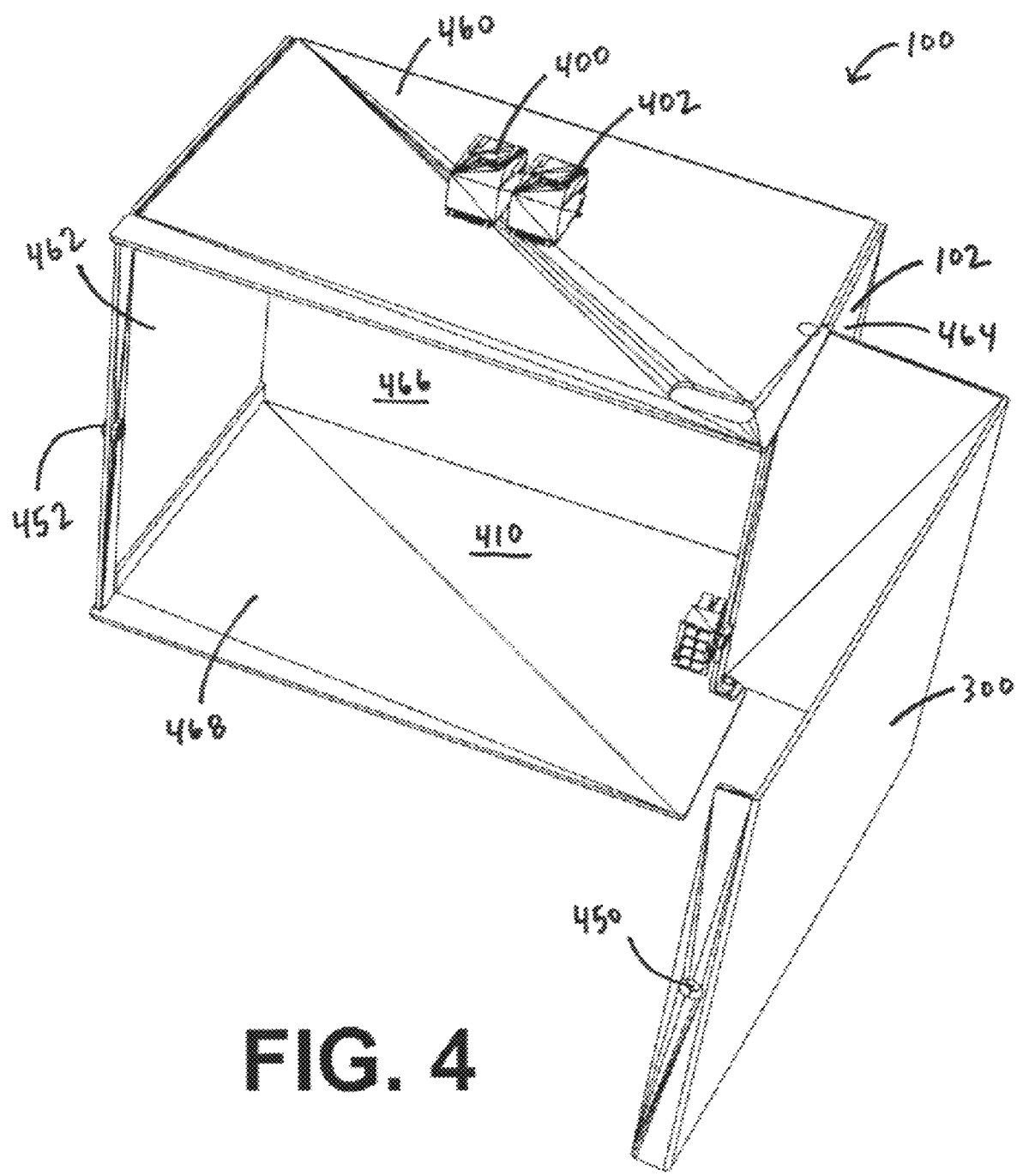
FIG. 4 shows a perspective view of an exemplary battery system without the battery portions therein and without a top door or cover, according to at least one embodiment of the present disclosure.

An exemplary battery system 100 of the present disclosure is shown in FIG. 3. As shown in FIG. 3, battery system 100 comprises an external housing 102 and a plurality of battery portions 104, such as lithium battery portions 104. Battery portions 104, as shown in FIG. 3, are configured to fit within external housing. A front door or cover 300, such as shown in FIG. 3, can be removably coupled or hingedly coupled to external housing 102, so to allow access to battery portions 104 when front door or cover 300 is open and to conceal battery portions 104 when front door or cover 300 is closed. A top door or cover 302 can also be removably coupled or hingedly coupled to external housing 102, as desired, whereby first and second manifolds 400, 402, such as shown in FIG. 4, can be concealed when top door or cover 302 is in a closed position. A positive terminal 310 and a negative terminal 312 are present on a relative exterior of external housing 102 so to readily allow connection of battery system 100 to portions of cart 200 or other electronic equipment.

FIG. 4 shows an external housing 102 without battery portions 104 therein, so that an interior compartment 410, namely the inside portion of external housing 102 where battery portions 104 can be placed/positioned, can be readily seen. Front door or cover 302, in various embodiments, can have a notch or aperture 450 defined therein, whereby a latch portion 452 of exterior housing 102 can engage notch or aperture 450 when front door or cover 302 is closed to secure front door or cover 302 in a closed position about external housing 102. FIG. 4 also shows relative sides/portions of exterior housing 102, such as, for example, a top portion 460, a first side portion 462, a second side portion 464 opposite first side portion 462, a back portion 466, and a bottom portion 468, whereby said portions 460, 462, 464, 466, 468 along with front door or cover 302 can enclose battery portions 102, for example.

Figure 5:
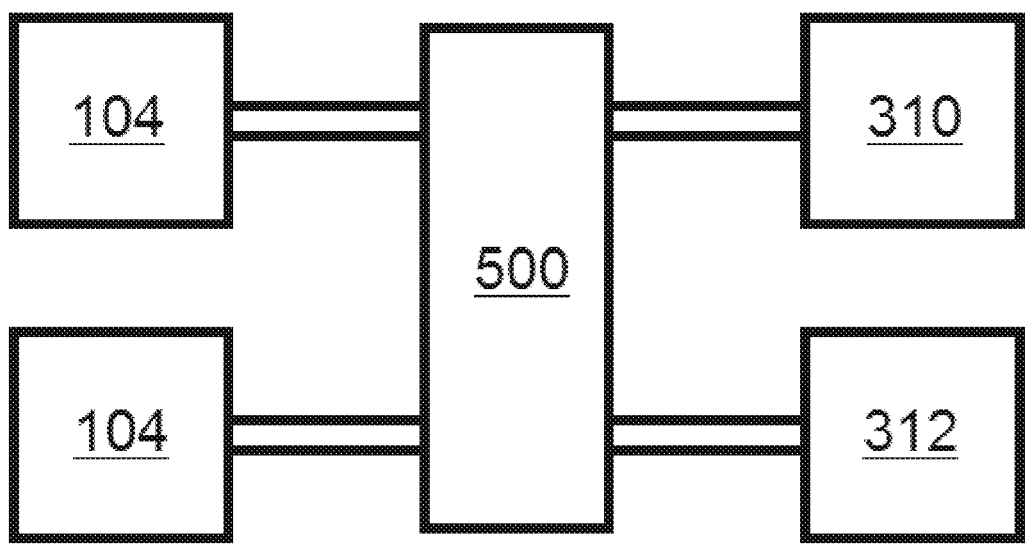
FIG. 5 shows a block component diagram of portions of an exemplary battery system, according to at least one embodiment of the present disclosure.

Each battery portion 104 within external housing 102 can effectively couple to one another through a central connector 500, such as shown in FIG. 5. As shown in FIG. 5, two or more battery portions 104 are configured to connect, directly or indirectly, to a central connector 500, whereby central connector 500 is configured to connect, directly or indirectly, to positive terminal 310 and negative terminal 312. With such a connection, for example, two or more battery portions 104 can be successfully used to provide power/energy to a cart 200 or other electronic equipment via positive terminal 300 and negative terminal 312 of external housing 102.

Figure 6A:
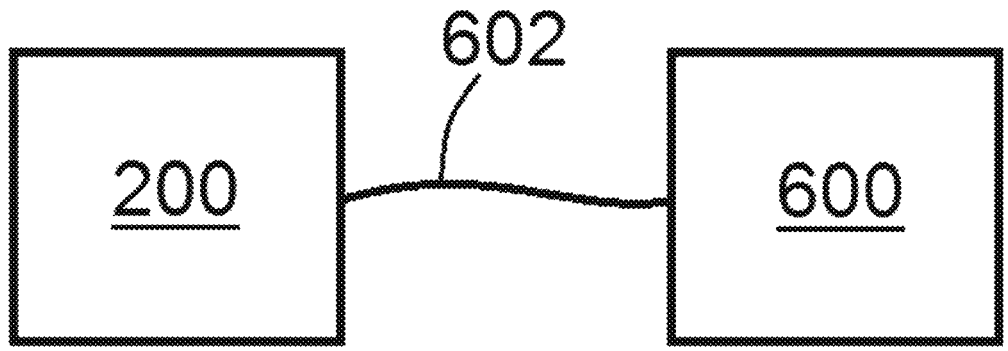
FIG. 6A shows a block component diagram of a cart connected to a power source so to charge battery portions of a battery system, according to at least one embodiment of the present disclosure.
Figure 6B:
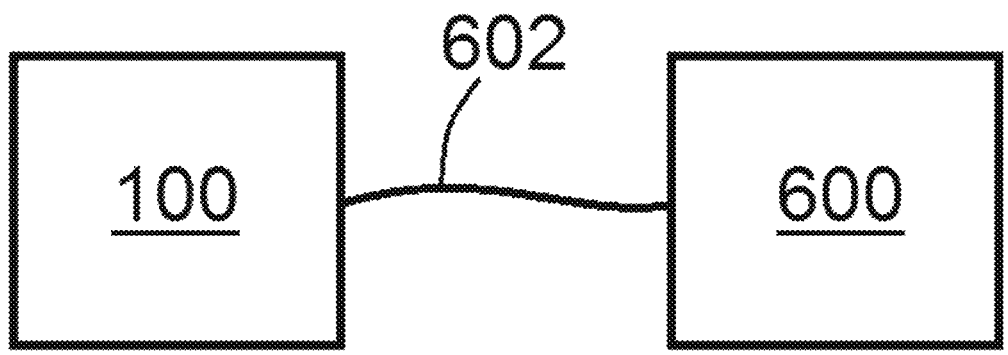
FIG. 6B shows a block component diagram of a battery system connected to a power source so to charge battery portions of the battery system, according to at least one embodiment of the present disclosure.
Figure 6C:
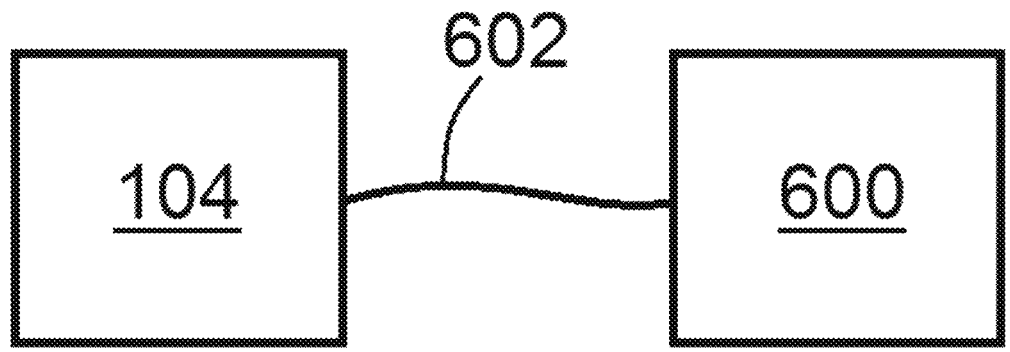
FIG. 6C shows a block component diagram of a battery portion connected to a power source so to charge the battery portion.

Battery systems 100 of the present disclosure can be charged in various ways, such as shown in FIGS. 6A, 6B, and 6C. As shown in FIG. 6A, a cart 200 can be connected to a power source 600, such as a power outlet, storage battery, etc., so to charge battery portions 104 within battery system 100. Said connection can be direct or indirect and can use, for example, a cord or connector 602 to connect battery system 100 to power source 600. Battery system 100 can also be charged outside of cart 200, such as shown in FIG. 6B whereby battery system 100 is connected, directly or indirectly, to power source 600, and may be connected using a cord or connector 602. Individual battery portions 104 can also be charged outside of external housing 102, such as shown in FIG. 6C whereby battery portion 104 is connected, directly or indirectly, to power source 600, and may be connected using a cord or connector 602.

While various embodiments of devices for battery systems containing recyclable battery portions and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A recyclable battery system for a mobile cart, comprising:
   a battery compartment within the mobile cart;
   a housing positioned within the battery compartment;
   two or more battery portions each weighing at or below a threshold weight of eleven pounds and configured to fit within the housing and be removable from the housing of the battery compartment of the mobile cart; and
   a central connector for connecting the two or more battery portions to one another to collectively produce sufficient power to power electronic equipment of the mobile cart; and
   wherein the housing further comprises a top door or cover coupled thereto, wherein the top door or cover conceals a first manifold and a second manifold of the battery system when the top door or cover is in a closed position,
   wherein when a first battery portion of the two or more battery portions are removed from the battery compartment of the mobile cart for recycling, the first battery portion can be recycled as it is at or below the threshold weight of eleven pounds.

2. The battery system of claim 1, wherein each battery portion of the two or more battery portions are configured to be charged by a power source when positioned within the housing within the battery compartment of the cart.

3. The battery system of claim 1, wherein each battery portion of the two or more battery portions are configured to be charged by an external power source when the two or more battery portions are positioned within the housing within the battery compartment of the cart.

4. The battery system of claim 1, wherein each battery portion of the two or more battery portions are configured to be charged by a power source when the two or more battery portions are positioned outside of the housing.

5. The battery system of claim 1, wherein the housing comprises a front door or cover coupled thereto, wherein the front door or cover can allow access to the two or more battery portions when the front door or cover is open.

6. The battery system of claim 1, wherein the top door or cover can allow access to the first manifold and the second manifold of the battery system when the top door or cover is open.

7. The battery system of claim 6, further comprising a positive terminal and a negative terminal present on a relative exterior of the external housing.

8. The battery system of claim 7, wherein the central connector is further connected to the positive terminal and the negative terminal so that the electronic equipment of the cart, when connected to the positive terminal and the negative terminal, can be powered from the two or more battery portions.

9. The battery system of claim 1, wherein the housing is further configured to receive a replacement battery portion to replace the first battery portion of the two or more battery portions.

10. The battery system of claim 1, forming part of a cart system, the cart system further comprising a computer and a display.

11. A recyclable battery system for a mobile cart, comprising:
    a battery compartment within the mobile cart;
    a housing positioned within the battery compartment; and
    two or more battery portions each weighing at, or below, a threshold weight of eleven pounds and configured to fit within the housing, and be removable from the housing of the battery compartment of the mobile cart;
    wherein the housing comprises a front door or cover coupled thereto, wherein the front door or cover can allow access to the two or more battery portions when the front door or cover is open; wherein the housing comprises a top door or cover coupled thereto, wherein the top door or cover can allow access to a first manifold and a second manifold of the battery system when the top door or cover is open; wherein the top door or cover conceals the first manifold and the second manifold of the battery system when the top door or cover is in a closed position;
    a central connector for connecting the two or more battery portions to one another to collectively produce sufficient power to power electronic equipment of the mobile cart when the electronic equipment is connected to a positive terminal and a negative terminal of the battery system that is also connected to the central connector; and
    wherein when a first battery portion of the two or more battery portions are removed from the battery compartment of the mobile cart for recycling, the first battery portion can be recycled as it is at or below the threshold weight of eleven pounds.

12. The battery system of claim 11, further configured to receive a replacement battery portion to replace the first battery portion of the two or more battery portions.

13. A mobile cart, comprising:
    a recyclable battery system, comprising:
       a battery compartment within the mobile cart;
       a housing positioned within the battery compartment;
          wherein the housing comprises a top door or cover coupled thereto, wherein the top door or cover conceals a first manifold and a second manifold of the battery system when the top door or cover is in a closed position
       two or more battery portions each weighing at, or below, a threshold weight of eleven pounds and configured to fit within the housing, and be removable from the housing of the battery compartment of the mobile cart;
       a positive terminal and a negative terminal; and
       a central connector connecting the two or more battery portions to one another, the positive terminal, and the negative terminal;
    a computer; and
    a display;
    wherein the two or more battery portions collectively produce sufficient power to power the computer and the display; and
    wherein when a first battery portion of the two or more battery portions are removed from the battery compartment of the mobile cart for recycling, the first battery portion can be recycled as it is at or below the threshold weight of eleven pounds.

14. The cart of claim 13, wherein the housing comprises a front door or cover coupled thereto, wherein the front door or cover can allow access to the two or more battery portions when the front door or cover is open, and wherein the top door or cover can allow access to the first manifold and the second manifold of the battery system when the top door or cover is open.

15. The cart of claim 13, wherein each battery portion of the two or more battery portions are configured to be charged by an external power source when the two or more battery portions are positioned within the housing within the battery compartment of the mobile cart.

16. The cart of claim 13, further configured to receive a replacement battery portion to replace the first battery portion of the two or more battery portions.

\* \* \* \* \*